United States Patent
Stuttaford et al.

(10) Patent No.: US 6,609,362 B2
(45) Date of Patent: Aug. 26, 2003

(54) APPARATUS FOR ADJUSTING COMBUSTOR CYCLE

(75) Inventors: Peter John Stuttaford, Toronto (CA); Aleksandar Kojovic, Oakville (CA)

(73) Assignee: Pratt & Whitney Canada Corp., Longueuil (CA)

( * ) Notice: Subject to any disclaimer, the term of this patent is extended or adjusted under 35 U.S.C. 154(b) by 0 days.

(21) Appl. No.: 09/903,641

(22) Filed: Jul. 13, 2001

(65) Prior Publication Data

US 2003/0010036 A1 Jan. 16, 2003

(51) Int. Cl.$^7$ ............................... F23R 3/06; F02C 7/10
(52) U.S. Cl. ......................... 60/39.511; 60/755; 60/756
(58) Field of Search ................................. 60/39.23, 755, 60/756, 757, 39.511

(56) References Cited

U.S. PATENT DOCUMENTS

| | | | | |
|---|---|---|---|---|
| 2,616,258 A | | 11/1952 | Mock | |
| 2,977,757 A | * | 4/1961 | Mock | 60/39.23 |
| 3,742,702 A | * | 7/1973 | Quinn | 60/39.23 |
| 3,744,242 A | * | 7/1973 | Stettler et al. | 60/39.23 |
| 3,765,171 A | * | 10/1973 | Hagen et al. | 60/39.23 |
| 3,777,484 A | | 12/1973 | Dibelius et al. | |
| 3,919,838 A | * | 11/1975 | Armstrong et al. | 60/39.23 |
| 3,921,390 A | * | 11/1975 | Stoltman | 60/39.23 |
| 3,986,347 A | * | 10/1976 | Schirmer | 60/39.23 |
| 4,078,377 A | * | 3/1978 | Owens et al. | 431/188 |
| 4,085,579 A | * | 4/1978 | Holzapfel et al. | 60/39.23 |
| 4,109,459 A | * | 8/1978 | Ekstedt et al. | 60/757 |
| 4,307,568 A | * | 12/1981 | Huller et al. | 60/39.511 |
| 4,458,481 A | * | 7/1984 | Ernst | 60/757 |
| 4,660,377 A | * | 4/1987 | Wadsworth | 60/39.511 |
| 4,719,748 A | | 1/1988 | Davis, Jr. et al. | |
| 5,085,038 A | * | 2/1992 | Todman et al. | 60/39.511 |
| 5,241,827 A | | 9/1993 | Lampes | |
| 5,381,652 A | | 1/1995 | Mezzedimi et al. | |
| 5,687,572 A | | 11/1997 | Schrantz et al. | |
| 5,758,504 A | | 6/1998 | Abreu et al. | |
| 5,784,876 A | | 7/1998 | Alkabie | |
| 6,082,093 A | * | 7/2000 | Greenwood et al. | 60/39.23 |

* cited by examiner

Primary Examiner—Ted Kim
(74) Attorney, Agent, or Firm—Pratt & Whitney Canada Corp.

(57) ABSTRACT

A method of combustor cycle air flow adjustment for a gas turbine engine according to the present invention solves the problem of a higher flame temperature in the combustor, thereby affecting the emission levels when a heat-recuperated air flow cycle is used to increase the compressed air temperature. In low emission combustors this impact is severe because emission levels are significantly dependent on the primary combustion zone flame temperature. The method of the present invention includes a step of changing a geometry of an air flow passage and thereby changing distribution of a total air mass flow between an air mass flow for combustion and an air mass flow for cooling in order to ensure that flame temperature in a primary combustion zone of a combustor are maintained substantially the same whether the gas turbine engine is manufactured to operate as a simple air flow cycle engine or as a heat-recuperated air flow cycle engine. In an embodiment of the present invention, the changing of the geometry of the air flow passage by changing the number and size of perforations in an impingement cooling skin so that with minimal changes the impingement cooling skin serves duel purposes both as a cooling device for cooling the combustor wall and as a valve means for combustor cycle air flow adjustment, which makes the method simple and economical.

2 Claims, 2 Drawing Sheets

APPARATUS FOR ADJUSTING COMBUSTOR CYCLE

FIELD OF THE INVENTION

The present invention relates to gas turbine engines, particularly to air flow distribution adjustment of gas turbine engines to ensure that low emissions not be affected by air flow cycle patterns of the engines whether the engine is designed as a simple air flow cycle or a heat-recuperated air flow cycle.

BACKGROUND OF THE INVENTION

Industrial gas turbine engines are subject to increasingly stringent emission requirements. In order to provide a marketable power generation product, an engine producing the lowest possible emissions is crucial. Emissions of nitrogen oxides ($NO_x$) and carbon monoxide (CO) must be minimized over specified engine operating ranges. To achieve this low level of emissions the combustion system requires the complete burning of fuel and air at low temperatures.

Combustors that achieve low $NO_x$ emissions without water injection are known as dry-low emissions (DLE) and offer the prospect of clean emissions combined with high engine efficiency. This technology relies on a high air content in the fuel/air mixture. While low emissions are critical, it is also important to minimize the cost of manufacturing and maintaining the combustion system, if a viable product is to be realized.

With regard to another aspect of the gas turbine engine, engine efficiency is always of critical concern. It is known that gas turbine efficiency can be substantially increased by recuperating heat from the engine exhaust. In a gas turbine engine using a heat-recuperating air flow cycle, compressor air is passed through a recuperator or heat exchanger attached to the engine exhaust end before entering the combustor. The resulting higher combustor inlet air temperature thus requires less fuel burn to achieve the same exit gas temperature compared with a gas turbine engine using a simple air flow cycle in which the compressor air enters the combustor directly and unaltered. The result of the heat-recuperated air flow cycle is significantly improved gas turbine cycle efficiency. The change in combustor inlet air temperature and result in a combustor fuel/air ratio shifting to achieve the same exhaust gas temperature. In low emission combustors the impact of fuel/air ratios shifting is the most severe because emission levels are intensely dependent on primary combustion zone fuel/air ratios. Adjusting the combustor geometry will compensate for the effect of fuel/air ratio change between combustors of gas turbine engines using simple and heat-recuperated air flow cycles. However, it can be cost prohibitive to adapt a gas turbine engine model which operates as a simple air flow cycle design, to be operable as a heat-recuperated air flow cycle design, or vice versa, Therefore, there is a need to develop a method of engine design to cost effectively overcome the effect of the combustor fuel/air ratio changing between simple and recuperated air flow cycles when adapting a gas turbine engine model to be operable as either a simple or a heat-recuperated air flow cycle design while achieving low emission levels.

SUMMARY OF THE INVENTION

One object of the present invention is to provide a method of low emission engine design for cost effectively overcoming the effect of a combustor fuel/air ratio change between simple and recuperated air flow cycles of the combustor engine.

Another object of the present invention is to provide a method of combustor cycle air flow adjustment for a gas turbine engine to ensure that the flame temperature is maintained substantially the same whether the gas turbine engine utilizes a simple air flow cycle or a heat-recuperated air flow cycle.

A further object of the present invention is to provide an impingement cooling skin for a gas turbine engine combustor which serves dual purposes as a cooling device to cool the combustor wall and as a valve to adjust distribution of a total air mass flow between an air mass flow for combustion and an air mass flow for cooling, thereby changing the fuel/air ratio to ensure that the combustor flame temperature is maintained substantially the same whether the gas turbine engine operates as a simple air flow cycle engine or a heat-recuperated air flow cycle engine.

In accordance with one aspect of the present invention, a method of combustor cycle air flow adjustment for a gas turbine engine design is provided. The method comprises a step of changing a geometry of an air flow passage and thereby changing distribution of a total air mass flow between an air mass flow for combustion and an air mass flow for cooling, in order to ensure that a flame temperature in a primary combustion zone of a combustor is maintained substantially the same whether the gas turbine engine operates as a simple air flow cycle engine or a heat-recuperated air flow cycle engine.

The geometry of the air flow passage is preferably changed to decrease the air mass flow for combustion when the gas turbine engine uses a heat-recuperated air flow cycle, compared with the air mass flow for combustion when the gas turbine engine uses a simple air flow cycle. It is preferable that the changing of the air flow passage geometry is achieved by changing a geometry of an impingement skin of the combustor.

In accordance with another aspect of the present invention, an impingement cooling skin in combination with a gas turbine engine combustor is provided. The impingement cooling skin is attached to the combustor and comprises a first group of holes therein adjacent to a combustor wall section defining a primary combustion zone, the number and size of the holes of the first group being predetermined to substantially meet a cooling requirement for the combustor. The impingement cooling skin further includes a second group of holes therein adjacent to a combustor wall section defining a secondary combustion zone, the number and size of the holes of the secondary group being adjusted to substantially meet a flow distribution requirement whether the gas turbine engine operates as a simple air flow cycle engine or a heat-recuperated air flow cycle engine.

The present invention advantageously provides a cost effective solution to overcome the effect of combustor fuel/air ratio change between a simple air flow cycle and a heat-recuperated air flow cycle of the gas turbine engine operation. Without any added parts, the impingement cooling skin of the combustor, according to the present invention, serves dual purposes as a cooling device to cool the combustor wall and as a valve to adjust the distribution of the total air mass flow between the air mass flow for combustion and the air mass flow for cooling such that the required air mass flow for maintaining the combustor flame temperature substantially the same, is achieved regardless of the engine air flow cycle pattern. Thus, low emissions of the gas turbine engine are ensured.

Other advantages and features of the present invention will be better understood with reference to a preferred embodiment described hereinafter.

BRIEF DESCRIPTION OF THE DRAWINGS

Having thus generally described the nature of the present invention, reference will now be made to the accompanying drawings, by way of example showing a preferred embodiment, in which.

DETAILED DESCRIPTION OF THE PREFERRED EMBODIMENT

Figure 1:
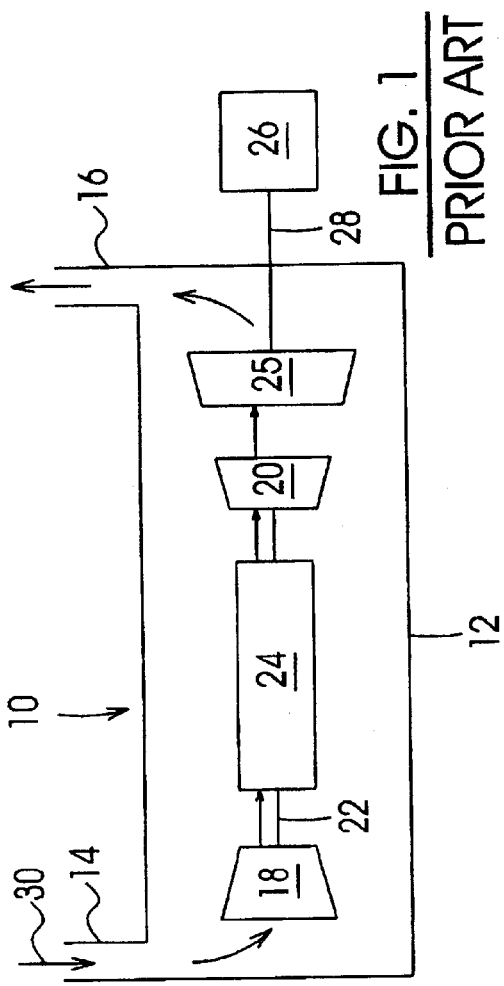
FIG. 1 is a schematical illustration of a gas turbine engine operating in a simple air flow cycle.

A simple air flow cycle of a gas turbine engine operation is schematically illustrated in FIG. 1, in which the gas turbine engine, generally indicated at numeral 10, includes a housing 12 having an air inlet 14 and a gas exhaust outlet 16. Within the housing 12 a compressor 18 is driven by a turbine 20 through a shaft 22. A combustor 24 is provided to generate combustion gases in order to rotate the turbine 20 and further rotate a power turbine 25 which in turn drives a generator 26 through a shaft 28. The air flows in the simple air flow cycle of the gas turbine engine operation are indicated by arrows 30. Air entering the inlet 14 is compressed by the compressor 18 and the compressed air then directly enters the combustor 24 for combustion. The combustion gases discharged from the combustor 24 are directed through the turbine 20 and the power turbine 25, and then the exhausted gases are discharged from the gas exhaust outlet 16.

Figure 2:
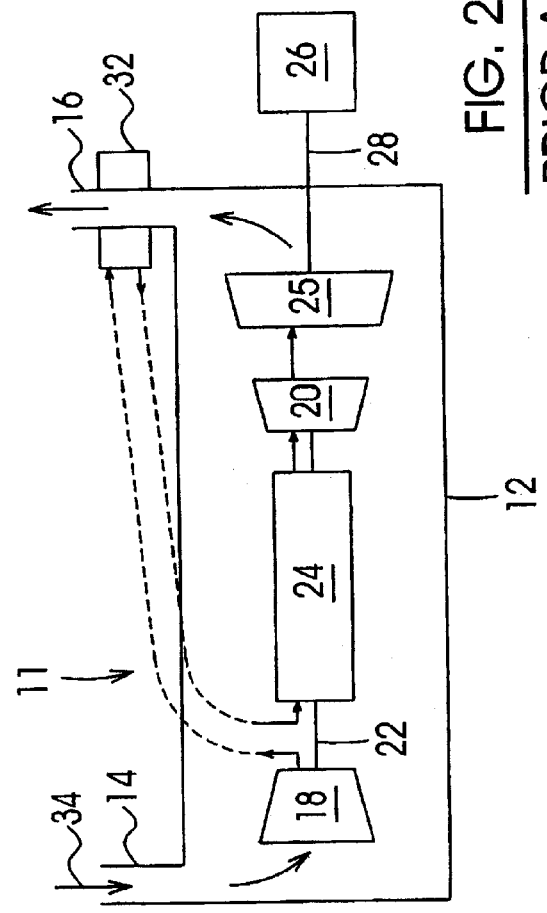
FIG. 2 is a schematical illustration of a gas turbine engine operating in a heat-recuperated air flow cycle.

A heat-recuperated air flow cycle of a gas turbine engine operation is schematically illustrated in FIG. 2, in which the engine, generally indicated at numeral 11 is similar to the gas turbine engine 10 of FIG. 1. The gas turbine engine 11 includes parts similar to those of gas turbine engine 10, which are indicated by similar numerals and will therefore, not be redundantly described herein. Additionally, gas turbine engine 11 includes a recuperator 32 which is a heat exchanger attached to the gas exhaust outlet 16 to recover heat from the exhausted gases. Air flows in the heat-recuperated air flow cycle of the gas turbine engine operation are indicated by arrows 34. The air entering the air inlet 14 is compressed by the compressor 18. However, instead of directly flowing into the combustor 24, the compressed air is directed to the recuperator 32 for heat exchange and then enters the combustor 24. Similar to the simple air flow cycle shown in FIG. 1, the combustion gases are discharged from the combustor 24 to rotate the turbine 20 and the power turbine 25 and then the exhausted gases are discharged from the gas exhaust outlet 16. The recuperator 32 transfers heat from the exhausted gases in the gas exhaust outlet 16 to the compressed air and therefore, the temperature of the compressed air entering the combustor 24 is much higher than the temperature of the compressed air which enters the combustor 24 in the simple air flow cycle as schematically illustrated in FIG. 1. Higher compressed air temperatures make the combustion operation more efficient, since less fuel is burned to achieve the same exhaust gas temperature.

Figure 3:
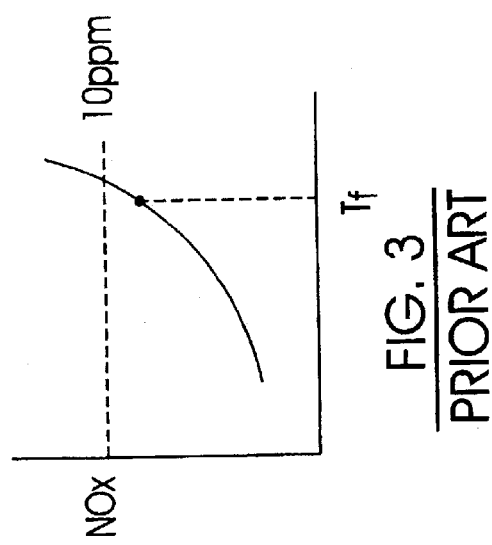
FIG. 3 is a graphical representation of the relationship between $NO_x$ emission levels and the flame temperature.

Nevertheless, lower compressed air temperatures increase the amount of fuel to be burned and the fuel/air ratio in the combustor 24 becomes richer. It is already known that $No_x$ emissions depend on flame temperatures as illustrated in FIG. 3, and it is desirable to maintain the flame temperature at a low point to meet the low $NO_x$ emission requirements. In a DLE system, the low flame temperature point is achieved by maintaining a very lean fuel/air ratio in the combustor, particularly in the primary combustion zone. Generally the lean fuel/air ratio in the combustor cannot be maintained when a gas turbine engine design is altered from that of a simple air flow cycle operation to that of a heat-recuperated air flow cycle operation, because more fuel must be burned to achieve the same exhaust gas temperature. Adjusting the combustor geometry will compensate for the effects of the switch between simple and heat-recuperated air flow cycles of a gas turbine engine operation. However, changing the combustor geometry is cost prohibitive on engine designs when it is desired to adapt a gas turbine engine model which operates as a simple air flow cycle design, to be operable as a heat-recuperated air flow cycle design, or vice versa.

Figure 4:
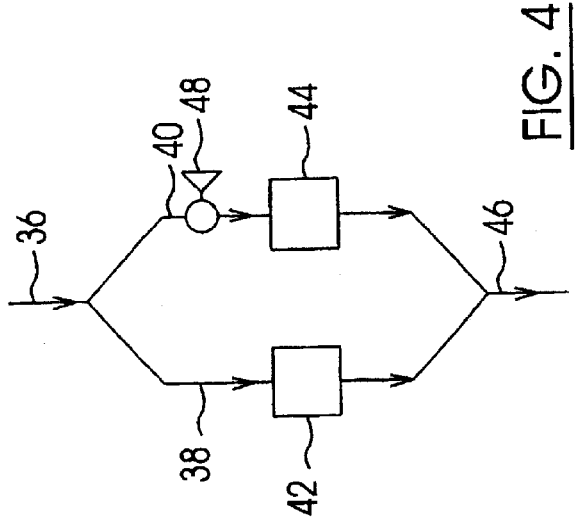
FIG. 4 is a diagram of a air flow distribution of a gas turbine engine incorporating the present invention.

A method of combustor cycle air flow adjustment for a gas turbine engine is therefore developed according to the present invention, and is generally illustrated in FIG. 4 in which a total air mass flow 36 of a gas turbine engine is distributed between an air mass flow 38 for a combustion system 42 of the engine and an air mass flow 40 for a cooling system 44 of the same engine. The exhausted combustion gases with exhausted cooling air are discharged from the engine as indicated by arrow 46. The temperature of the exhausted combustion gases must remain constant, independent of cycle. 1f resistance to either air mass flow 38 or 40 is changed, the distribution of the total air mass flow 36 between the air mass flow 38 for the combustion system 42 and the air mass flow 40 for the cooling system 44 will be changed accordingly. The change of air mass flow resistance can be achieved with a valve means 48 which may be connected to either air flow branch, connected to the air flow branch for the air mass flow 40.

According to the present invention there is no need for the valve means 48 physically presented herein, to adjust the air flow resistance in either air flow branch. Changing the geometry of an air passage for either air mass flow 38 or 40 will perform a virtual valve function, regulating the air flow resistance of the air passage for the air mass flow 38 or 40, thereby resulting in adjustment of the air flow distribution. When the engine is to be designed for a heat-recuperated air flow cycle operation and that design is adapted from an engine design for a simple air flow cycle operation, changing the geometry of the air passage either for the air mass flow 38 or the air mass flow 40 in order to decrease the air mass flow 38, will compensate for the decreased fuel burn, thereby maintaining the flame temperature in the primary combustion zone of the combustor and exhaust gas temperature, substantially the same whichever original engine design is used.

Figure 5:
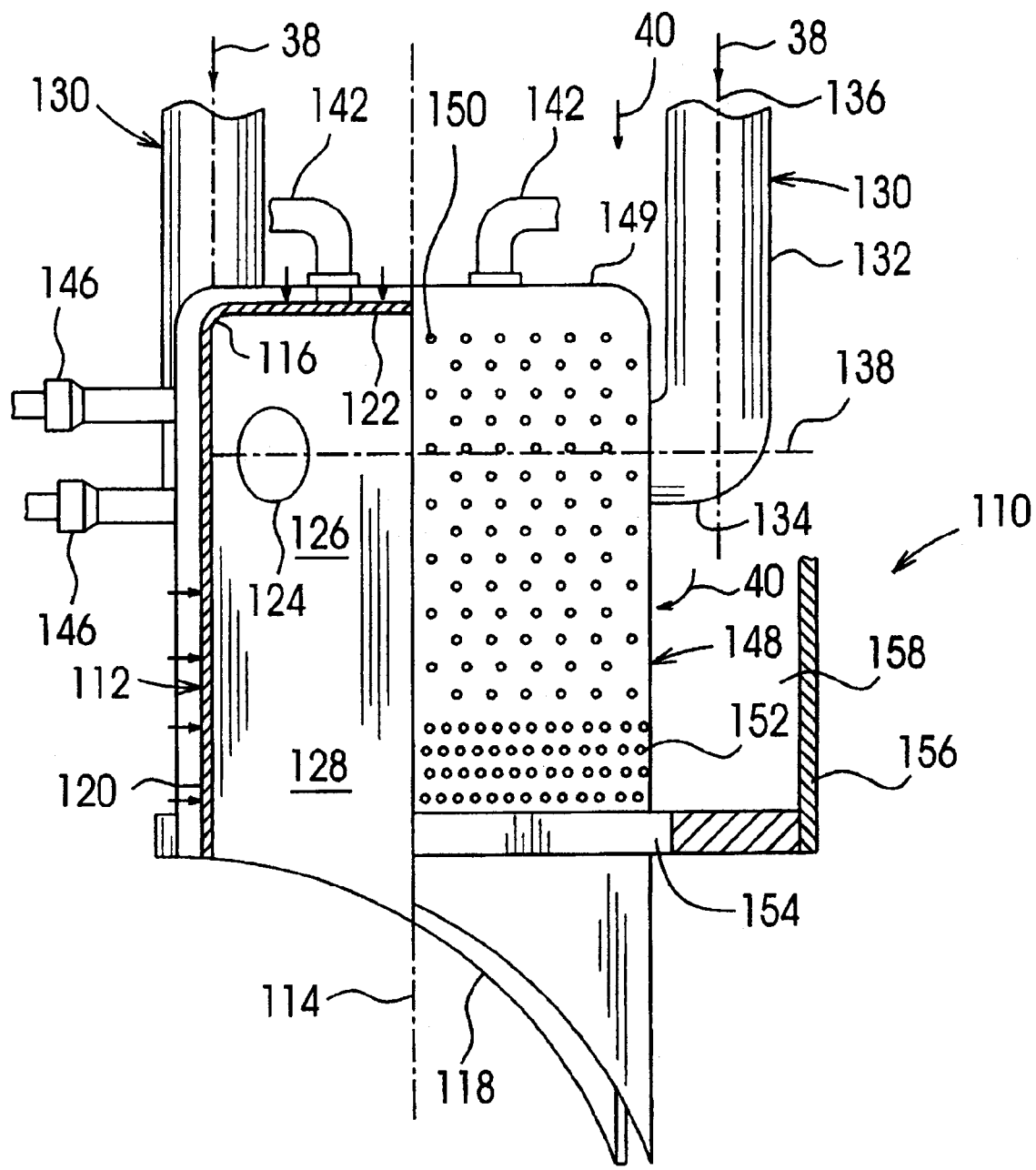
FIG. 5 is an elevational side view of a gas turbine combustor with an impingement cooling skin attached thereto according to one embodiment of the present invention, a section of the combustor being cut away to show the cross-section of the combustor.

In accordance with one embodiment of the present invention, it is convenient and cost effective to change the geometry of an impingement cooling skin to affect the air mass flow 38 for the combustion system 42 which is illustrated in FIG. 5. A cyclone combustor 110 includes a cylindrical combustor can 112 having a central axis 114, an upstream end 116 and a downstream end 118 defined by an annular side wall 120. The upstream end 116 is closed by an upstream end wall 122 and the downstream end 118 is in fluid communication with a turbine section of the engine (not shown). Three entry openings 124 (only one is shown) are provided in the annular side wall 120 adjacent to the upstream end wall 122 for receiving premixed fuel/air mixture into the combustor can 112. The combustion processing of the premixed fuel/air mixture takes place generally in a primary combustion zone 126 which is defined within an upstream section of the combustor can 112. The combustion products generated within the primary combustion zone 126, as well as the un-reacted fuel and air will complete the combustion process in a secondary combustion zone 128 which is a section of the combustor can 112 downstream of the primary combustion zone 126. The final combustion products are then discharged from the downstream end 118 into the turbine.

Three fuel and air premixing tubes 130, such as venturi premixing tubes,(only two are shown) are attached to the side wall 120 of the combustor can 112 and are positioned adjacent to the upstream end wall 122. The premixing tubes 130 are circumferentially, equally spaced apart from one another and are in fluid communication with the combustor can 112 through the respective entry openings 124 in the side wall 120.

Each premixing tube 130 includes a major tube section 132 for producing the fuel/air mixture therein and an outlet section 134 for injecting the fuel/air mixture into the combustor can 112 for combustion. The major tube section 132 has a central axis 136 thereof extending substantially parallel to the central axis 114 of the combustor can 112. The outlet section 134 has a central axis 138 thereof extending substantially perpendicular to the central axis 136 of the major tube section 132 and is oriented toward the combustor can 112 radially with a tangential offset. Thus, lean fuel/air mixture flows injected from the respective entry openings 124 in the side wall 120 create a swirling helical pattern within the primary combustion zone 126 of the combustor can 112 as a result of the tangential offset of the lean fuel/air mixture flows exiting from the outlet sections 134 of the premixing tubes 130, respectively. The swirling helical pattern of the burning lean fuel/air mixture in the primary combustion zone 126 provides optimum circulation of low temperature flames in the combustor can 112 which improves the liner life span of the combustor can 112, flame stability in the combustion process and engine turn-down, as well as the reduction of combustion noise and emission levels.

The size of the tube advantageously inhibits flashback from the primary combustion zone 126 into the major tube section 132 of the premixing tube 130. Pilot fuel lines 142 and ignitors 146 are placed to take advantage of the locations of the entry openings 124 and the tangential direction of the lean fuel/air mixture flow momentum generated from the tangential offset of the premixing tubes 130.

An impingement cooling skin 148 is provided. The impingement cooling skin 148 is made of a wrap-around sheet metal with perforations therein and is positioned around the annular side wall 120 of the combustor can 112 in a radially spaced apart relationship. It is optional that the impingement cooling skin 148 includes a perforated end skin 149 positioned axially spaced apart from the upstream end wall 122 of the combustor can 112.

The perforations in the impingement cooling skin 148 as well as in the end skin 149 are formed in two groups. The first group of perforations includes holes 150 in the end skin 149 and in a section of the impingement cooling skin 148 adjacent to a combustor wall section defining the primary combustion zone 126. A second group of perforations includes holes 152 in a section of the impingement cooling skin 148 adjacent to a combustor wall section defining the secondary combustion zone 128. The first group of holes 150 are distributed in a predetermined pattern with a predetermined number and a predetermined size thereof to substantially meet the cooling requirements of the combustor wall section defining the primary combustion zone 126. The size and number, as well as the distribution pattern of the second group of holes 152 are subject to change when the cyclone combustor 110 is designed for different air flow cycle operations, in order to substantially meet the flow distribution requirements relating to the particular air flow cycle of a gas turbine engine operation, as well as to provide secondary zone cooling.

The impingement cooling skin 148 further includes a sealing ring 154 which is sealingly connected to a housing 156, only a section of which is shown in FIG. 5. The housing 156 contains the combustor can 112, and an annulus 158 is thereby formed therebetween as a section of the air passage for cooling air. When compressed air approaches the cyclone combustor 110 from above, the total air mass flow is distributed between the air mass flow 38 which enters the premixing tubes 130 to mix with fuel to produce the fuel/air mixture for combustion in the combustor can 112, and the air mass flow 40 which enters holes 150 in the end skin 149 and holes 150 and 152 in the impingement cooling skin 148 by way of the annulus 158. The air entering the holes 150 in the end skin 149 and holes 150 and 152 in the impingement cooling skin 148 impinges upon the upstream end wall 122 and side wall 120 of the combustor can 112 to remove the heat therefrom. The combustor wall section defining the primary combustion zone 126 is generally exposed to higher temperatures than the combustor wall section defining the secondary combustion zone 128, therefore the combustor wall section defining the primary combustion zone 126 is cooled by the air from the holes 150 which are specifically designed to substantially meet the cooling requirements regardless of the air flow cycles of the gas turbine engine operation.

In contrast to the predetermined pattern of the holes 150, the holes 152 are designed substantially in accordance with the air flow distribution requirements for the particular air flow cycles of gas turbine engine operation. When the combustor 110 is designed for a simple air flow cycle operation, the number and size of the holes 152 are decreased to increase the air resistance of the cooling air passage relative to the air mass flow distribution for a heat-recuperated air flow cycle operation, such that less air mass flow 40 is directed for cooling while relatively more air mass flow 38 is directed to the premixing tubes 130 for combustion.

On the other hand, when the combustor 110 is designed for a heat-recuperated air flow cycle the number and size of the air holes 152 are increased to reduce the air resistance in the cooling air passage such that relative to the air mass distribution for the simple air flow cycle operation, more air mass flow 40 is directed for cooling and relatively less air mass flow 38 is directed into the premixing tubes 130 for combustion.

In the embodiment of the present invention, by using such a method, the impingement cooling skin 148, 149 serves duel purposes both as a cooling device to cool the combustor wall 120, 122 and as a valve means to adjust air distribution flow between air mass flows 38, 40 for combustion. Thus, it is convenient and cost effective to just modify the impingement cooling skin 148, 149 design without need for other complicated changes of the combustor in order to provide a gas turbine engine design for either simple or heat-recuperated air flow cycle operation while maintaining emissions at a same low level. Changing the number and size of holes 152 of the impingement cooling skin 148 will also affect cooling results. However, the holes 152 are designated for air impingement upon the combustor wall section defining the secondary combustion zone 128 which is exposed to lower temperatures and therefore the negative effect of cooling is reduced. The cooling aspect is optimized for the more severe conditions related to heat-recuperated cycles.

Optionally, a gas turbine engine combustor may be manufactured with a removable cover sheet or ring to selectively cover the holes 152 of the impingement cooling skin 148, according to a further embodiment of the present invention. Thus, the gas turbine engine is adapted to operate alternatively as a simple or heat-recuperated air flow cycle engine while maintaining low emission levels.

The method of combustor cycle air flow adjustment for a gas turbine engine according to the present invention is applicable to various combustor systems, and the cyclone combustor described above is an example only, illustrating a particular embodiment of the present invention. This invention is also applicable to swirled diffusion dump combustion designs. Modifications and improvements to the above-described embodiment of the present invention may become apparent to those skilled in the art. The foregoing description is intended to be exemplary rather than limiting. The scope of the invention is therefore intended to be limited solely by the scope of the appended claims.

We claim:

1. A set of impingement cooling skins for a gas turbine engine combustor to which is attached a constituent impingement skin selected from the set of impingement cooling skins, the set of impingement skins comprising:

at least a first impingement cooling skin, the first skin having a first group of holes therein adjacent to a combustor wall section defining a primary combustion zone, and a second group of holes therein adjacent to a combustor wall section defining a secondary combustion zone; and at least a second impingement cooling skin, the first second skin having a first group of holes therein adjacent to a combustor wall section defining a primary combustion zone, and a second group of holes therein adjacent to a combustor wall section defining a secondary combustion zone, wherein the number and size of the holes of the first group in each of the at least first and second cooling skins being predetermined to substantially meet a cooling requirement for the combustor;

and wherein the number and size of the holes of the second group of the at least first and second cooling skins being adjusted relative to one another to substantially meet a flow distribution requirement for maintaining a substantially constant primary zone temperature when a configuration of the gas turbine engine is changed between a simple air flow cycle, when the first cooling skin is installed on the gas turbine engine, and a heat-recuperated air flow cycle, when the second cooling skin is installed on the gas turbine engine.

2. A gas turbine engine selectively operable in a simple air flow cycle configuration and a heat-recuperated air flow cycle configuration, the gas turbine engine comprising:

a combustor, the combustor having at least a primary and secondary combustion zone portions;

a source of compressed combustion air in communication with the combustor; and a set of at lease two impingement cooling skins, each impingement cooling skin adapted for mounting around at least a portion of the combustor, wherein only one impingement cooling skin of the set is mounted on the gas turbine engine at a given time depending on whether the gas turbine engine is to be operated in a simple air flaw cycle configuration or a heat-recuperated air flow cycle configuration, the set of impingement cooling skins including at least:

a first impingement cooling skin having a tint group and a second group of holes therein, the first and second groups of holes being located so that the first group of holes is adjacent the primary combustion zone portion and the second group of holes is adjacent to the secondary combustion zone portion when the first impingement cooling skin is mounted on the gas turbine engine; and a second impingement cooling skin having a first group and a second group of holes therein, the first and second groups of holes being located so that the first group of holes is adjacent the primary combustion zone portion and the second group of holes is adjacent to the secondary combustion zone portion when the second impingement cooling skin is mounted on the gas turbine engine, wherein the first group of holes in each of the first and second impingement cooling skins are located and sized to provide a desired cooling requirement for the combustor;

and wherein the holes of the second group of the first impingement cooling skin are located and sized to facilitate the maintenance of a desired primary zone temperature when the first impingement cooling skin is installed on the gas turbine engine and the gas turbine engine is operated in a simple air flow cycle configuration, and wherein the holes of the second group of the second impingement cooling skin are located and sized to facilitate the maintenance of substantially the same desired primary zone temperature when the second impingement cooling skin is installed on the gas turbine engine arid the gas turbine engine is operated in a heat-recuperated sir low cycle configuration, and wherein the number and size of the holes of the second group of the first and second impingement cooling skins differ from one another.

* * * * *

UNITED STATES PATENT AND TRADEMARK OFFICE
CERTIFICATE OF CORRECTION

PATENT NO.   : 6,609,362 B2
DATED        : August 26, 2003
INVENTOR(S)  : Peter John Stuttaford and Aleksandar Kojovic It is certified that error appears in the above-identified patent and that said Letters Patent is hereby corrected as shown below:

Column 8,
Line 22, delete "tint" and insert -- first --
Line 55, delete "arid" and insert -- and --
Line 56, delete "sir" and insert -- air --
Line 56, delete "low" and insert -- flow --

Signed and Sealed this

Twenty-eighth Day of October, 2003

JAMES E. ROGAN
*Director of the United States Patent and Trademark Office*